Sept. 27, 1932.   A. C. T. ISAAC   1,879,276
INDICATING DEVICE FOR ELECTRICAL APPARATUS
Filed Aug. 16, 1929
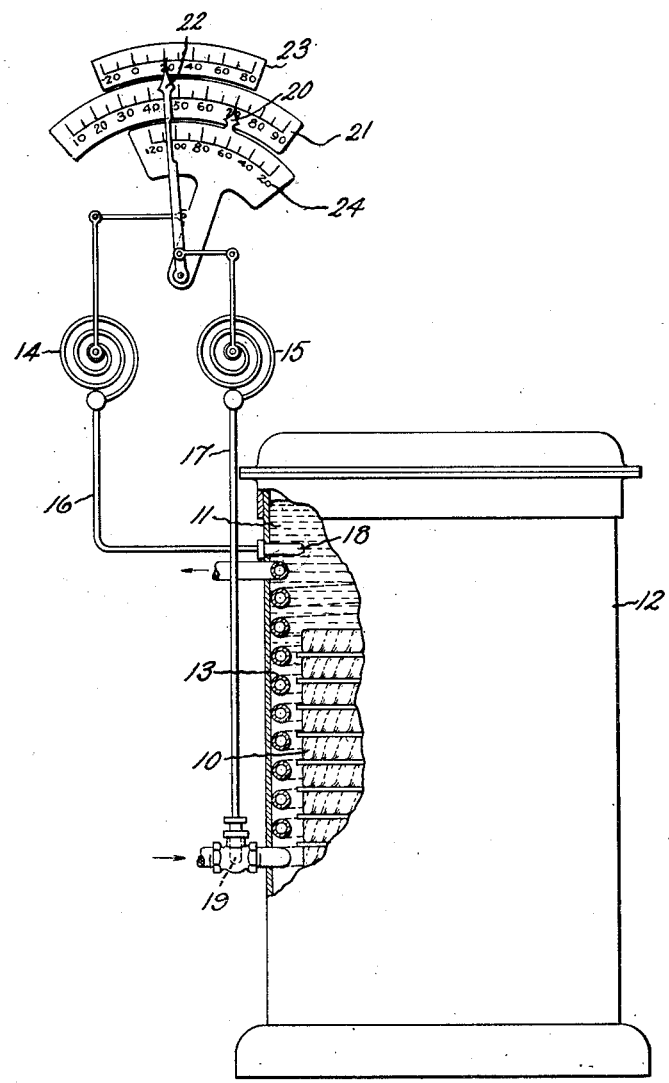
Inventor:
Archibald C.T. Isaac,
by Charles V. Tullar
His Attorney.

Patented Sept. 27, 1932

1,879,276

UNITED STATES PATENT OFFICE

ARCHIBALD C. T. ISAAC, OF RUGBY, ENGLAND, ASSIGNOR TO GENERAL ELECTRIC COMPANY, A CORPORATION OF NEW YORK

INDICATING DEVICE FOR ELECTRICAL APPARATUS

Application filed August 16, 1929. Serial No. 386,474.

My invention relates to indicating devices for electrical apparatus such as transformers and reactors which are immersed in an insulating and cooling liquid. The electrical and magnetic losses in the apparatus appear as heat which raises the temperature of the apparatus and this limits the maximum safe load which the apparatus can carry. While the apparatus is in operation, therefore, it is important to know at all times the temperature and load conditions of the apparatus and particularly of the windings where the temperature is usually highest. The general object of the invention is to provide an improved indicating device for this purpose.

The invention with its objects and advantages will be better understood from the following description taken in connection with the accompanying drawing which shows a water cooled transformer provided with an indicating device constructed and arranged in accordance with the invention.

The electrical apparatus which has been selected for the purpose of explaining the invention is, as shown in the drawing, a transformer 10 immersed in a body of insulating oil 11 in a casing 12. A current of water in a coil of pipe 13 immersed in the oil carries away the heat generated by the transformer while in operation.

The indicating device includes two Bourdon tubes 14 and 15 connected respectively by tubes 16 and 17 to bulbs 18 and 19. The Bourdon tube 14 is connected to control an indicator 20 movable over a fixed temperature scale 21. The Bourdon tube 15 is connected to control an indicator 22 movable over a fixed temperature scale 23. The bulb 18 is immersed in the body of oil 11, preferably near the upper part of the casing 12, so that the indicator 20 moves in response to temperature changes in the oil and indicates the temperature of the oil on the scale 21. The bulb 19 is in contact with the current of cooling water in the pipe 13, preferably at a point near where the water in the pipe enters the casing 12 so that the bulb will not be influenced by any heat from the transformer. The indicator 22 thus moves in response to temperature changes in the cold water and indicates the temperature of the water on the scale 23. The indicators 20 and 22 are pivoted about the same axis and the indicator 20 carries a scale 24 movable with it and extending under the indicator 22 which therefore gives simultaneous indications on both of the scales 23 and 24. The scale 24 is graduated to indicate the internal or winding temperature of the transformer.

While the transformer is in operation, its internal temperature will always be higher than the oil temperature and the scale 24 is graduated and positioned under the indicator 22 to show this higher temperature. Changes in the temperature of the cooling water as shown by the indicator 22 on the scale 23 will affect the rate at which the heat is dissipated from the transformer and will therefore affect both the internal temperature and the oil temperature. A change in water temperature will therefore cause a movement of the scale 24 due to a change in oil temperature and a movement of the indicator 22 due to the change in water temperature so that the indicator 22 will always show the internal temperature on the scale 24. It may be assumed that all the heat generated in the transformer is carried away and dissipated by the water because the amount of heat dissipated into the surrounding air from the surface of the casing 12 is practically negligible in comparison. The drawing shows substantially the relative arrangements and proportions of one form of the invention which has been found to give the desired results throughout the temperature ranges commonly experienced in the operation of a transformer.

The invention has been explained by describing and illustrating a particular form and application thereof but it will be apparent that changes may be made without departing from the scope of the invention as covered by the appended claims.

What I claim as new and desire to secure by Letters Patent of the United States, is:

1. The combination with water cooled electrical apparatus immersed in insulating liquid of an indicating device including means, responsive to temperature changes in the cooling water before it has been influenced by heat from said apparatus, means responsive to temperature changes in said insulating liquid, and means for combining the effects of said two temperature responsive means to indicate an internal temperature dependent condition of said apparatus.

2. An indicating device for electrical apparatus immersed in insulating liquid arranged to dissipate heat to a cooling medium, said device including means to respond to temperature changes in said insulating liquid, and means to respond to temperature changes in said cooling medium before it has been influenced by heat from said apparatus, one of said means including a movable scale and the other of said means including a movable indicator for said scale, whereby said indicator and scale may show an internal temperature dependent condition in said apparatus.

3. An indicating device for electrical apparatus immersed in insulating liquid arranged to dissipate heat to a cooling medium, said device including a fixed scale, an indicator for said scale to show the temperature of said insulating liquid, and a second scale and indicator one of which is movable with said liquid temperature indicator and the other of which is responsive to temperature changes in said cooling medium before it has been influenced by heat from said apparatus to show an internal temperature dependent condition in said apparatus.

4. An indicating device for water cooled electrical apparatus immersed in insulating liquid, said device including a fixed scale, an indicator for said scale to indicate the temperature of the cooling water before it has been influenced by heat from said apparatus, a second fixed scale, an indicator for said second scale to indicate the temperature of said insulating liquid, and a scale movable with one of said indicators and extending near said second indicator to show an internal temperature dependent condition of said apparatus.

In witness whereof, I have hereunto set my hand this 30th day of July, 1929.

ARCHIBALD C. T. ISAAC.